Patented May 6, 1924.

1,492,871

UNITED STATES PATENT OFFICE.

FOORD VON BICHOWSKY, OF GLENDALE, CALIFORNIA.

METHOD FOR PRODUCTION OF CYANOGEN COMPOUNDS.

No Drawing.  Application filed August 6, 1923. Serial No. 656,111.

*To all whom it may concern:*

Be it known that I, FOORD VON BICHOW-SKY, a citizen of the United States, and a resident of Glendale, county of Los Angeles, State of California, have invented a new and useful Method for Production of Cyanogen Compounds, of which the following is a specification.

My invention relates to improvements in methods for the production of cyanogen compounds, and in particular to hydrocyanic acid and the alkali metal cyanides, from furnace products containing the latter. In the carrying out of my invention I obtain excellent yields of cyanogen compounds under conditions previously thought most unfavorable and I obtain these excellent results, with a minimum of process regulations, in a simple, and yet exceptionally safe manner.

It has been known for a long time that alkali metal cyanides are quantitatively decomposed into hydrocyanic acid and an alkali metal carbonate by the combined action of carbon dioxide and water: Beilstein "Handbuch der Organischen Chemie," edition of 1893, vol. 1, page 1413: in accordance with the following general equation

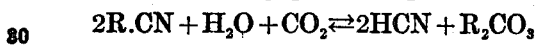

$$2R.CN + H_2O + CO_2 \rightleftharpoons 2HCN + R_2CO_3$$

where "R" represents an alkali metal.

Recently this method has been proposed for the recovery of cyanogen compounds from impure mixtures containing them. According to United States Letters Patent No. 1,385,335 the cyanide containing mass is treated with carbon dioxide and water the temperature being so regulated that polymerization of the hydrocyanic acid, which action is stated to be quite active at 30°-40° C., is avoided. In United States Letters Patent No. 1,385,336, this same polymerization of the acid is minimized by greatly increasing the rate of flow of the carbon dioxide gas over the mass to be treated.

I have now discovered that the hydrocyanic acid may be recovered in a practically theoretical amount and in a pure form from products containing pure or impure alkali metal cyanides such as for example the furnace products resulting from heating together a nitride, a carbide and an alkali metal carbonate as described in my copending application Serial No. 474,222, or from any other cyanide containing mass, providing the operation be conducted at below atmospheric pressure, and that $CO_2$ and water vapor be present in excess of that required by theory. Under these conditions no attention need be paid to cooling the mass, as no visible polymerization results even at 40° C., and in addition the rate of carbon dioxide flow can be made quite low. To carry out my discovery it is only necessary to place the moist alkali metal cyanide containing mass in a suitable container, adapted to be closed and equipped with a stirring device, to then evacuate the container to a barometric reading, of say, 20 inches of mercury, and allowing carbon dioxide to flow into the container at such a rate that the gauge reading on the container is not noticeably changed. The resulting hydrocyanic acid may be recovered from the exhaust gases from the vacuum pump, by condensation or else by absorption in NaOH solution, in solid NaOH or $Na_2CO_3$, or in any other suitable alkaline reagent.

If desired the absorption in the solid NaOH or soda ash may take place under a reduced pressure so that the water which is set free escapes at a temperature which does not cause the resulting NaCN to have a dark color.

It is also much safer to carry out the liberation and absorption of HCN under less than atmospheric pressure as any leakage in the apparatus will be from without toward the inside of the apparatus, and therefore no danger to the workmen from the accidental inhaling of the very poisonous hydrocyanic acid can result.

I claim:

1. The method for recovering pure cyanogen compounds from materials cantaining them which consists in treating the materials with water and carbon dioxide under less than atmospheric pressure and in recovering the cyanogen compounds.

2. The method for recovering pure cyanogen compounds from materials containing them which consists in treating the materials with water and carbon dioxide under less than atmospheric pressure and in absorbing the hydrocyanic in an alkali compound of an alkali metal likewise kept under reduced pressure.

3. The method for recovering pure cyanogen compounds from materials containing them which consists in treating the materials with water and carbon dioxide and absorbing the resulting hydrocyanic acid in sodium hydroxide, the entire operation taking place under less than atmospheric pressure.

4. The method of recovering pure cyanogen compounds from materials containing the same, which consists in treating the materials with water in the liquid phase and carbon dioxide gas and absorbing the resulting hydrocyanic acid in sodium hydroxide, the entire operation taking place under less than atmospheric pressure and under such temperature conditions and rates of flow as to avoid polymerization of the resulting products.

FOORD VON BICHOWSKY.